Oct. 30, 1962     W. W. CORTISS     3,060,727
APPARATUS FOR DETERMINING SURFACE ACTIVITY OF LIQUIDS
Filed June 4, 1959
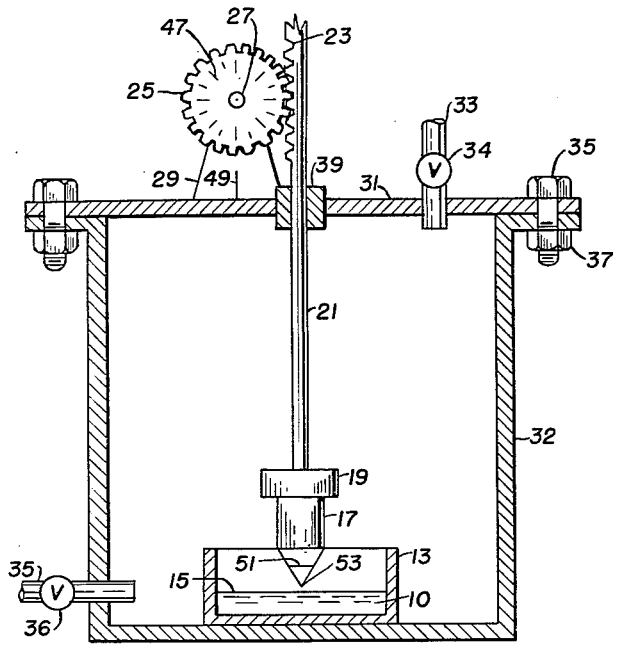
FIG.1
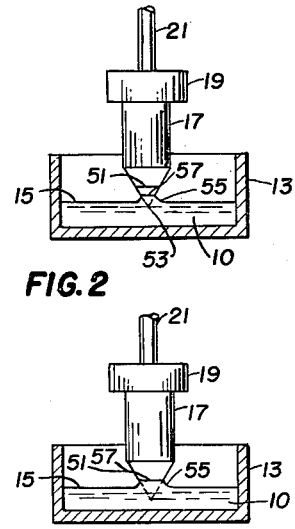
FIG.2
FIG.3
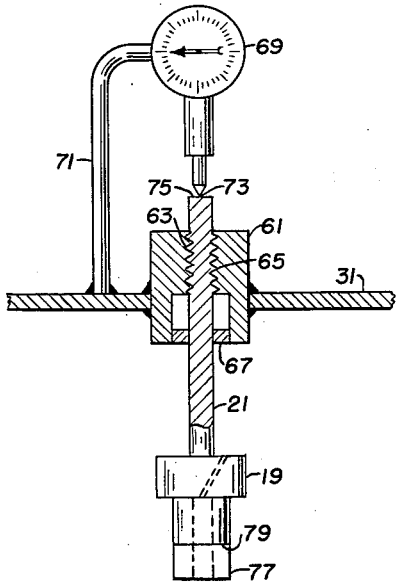
FIG.4
INVENTOR.
WARREN W. CORTISS
BY
Edward H. Lang
ATTORNEY

3,060,727
APPARATUS FOR DETERMINING SURFACE ACTIVITY OF LIQUIDS

Warren W. Cortiss, Crystal Lake, Ill., assignor to The Pure Oil Company, Chicago, Ill., a corporation of Ohio
Filed June 4, 1959, Ser. No. 818,021
6 Claims. (Cl. 73—53)

This invention is directed to an apparatus for determining the surface-wetting abilities of liquids. The apparatus of this invention is especially useful in determining the relative wetting abilities of various members of a given class of liquids, such as lubricating oils and surfactant-containing solutions. The data thus obtained are useful in evaluating experimental formulations, and as an aid in predicting the usefulness and field-performance characteristics of such liquids.

It is an object of this invention to provide an apparatus for determining the wetting abilities of liquids.

It is another object of this invention to provide an apparatus for determining the relative wetting abilities of liquids by measuring the level to which the liquid wets the surface of a member immersed in the liquid.

It is another object of this invention to provide an apparatus for measuring the surface tension of liquids.

Yet another object of this invention is to provide an apparatus by which the height of rise of a fluid in a capillary, or the height to which a liquid wets a surface immersed therein, can be more accurately measured.

Briefly, the apparatus of this invention comprises a slidable vertical rod having at its lower end a vertical flat surface which tapers downward to a point. A horizontal line is scribed on the flat surface about ¼ of an inch up from the point. The rod is lowered until the point is seen to contact the liquid to be tested. The vertical position of the rod is indicated by a suitable measuring device. The rod is then again lowered until the level to which the liquid wets the rod coincides with the horizontal line. The distance through which the rod was lowered from the time of initial contact with the liquid is then determined, and this distance is a measure of the ability of a liquid to wet the flat surface.

This invention is thus described with reference to the drawings, of which:

FIGURE 1 is a front elevation, partially in section, of the apparatus of this invention.

FIGURE 2 is a front elevation, partially in section, of the liquid receptacle and immersion test member shown in FIGURE 1, after the immersion test member has touched the liquid.

FIGURE 3 is a front elevation, partially in section, of the apparatus shown in FIGURE 2, after the immersion test member has been lowered until the horizontal line coincides with the level to which the liquid wets the immersion test member.

FIGURE 4 is a front elevational view, partially in section, of an alternate structure for measuring the distance through which the immersion test member is lowered.

Liquid sample 10, contained in vessel 13, has an upper surface 15. Immersion test member 17 is supported by means of chuck 19 on rod 21. The upper end of rod 21 is provided with rack gear 23 and mating pinion 25. Pinion gear 25 rotates on a horizontal axle 27, which is supported by support member 29, which is attached to cover 31. Cover 31 is attached to vessel 32 and forms a fluid-tight seal therewith. Suitable means, such as bolts 35 and nuts 37, are used to secure cover 31 to vessel 32. Rod 21 is adapted to slide freely in guide 39 which is supported at the center of cover 31. Guide 39 permits vertical axial movement of rod 21 and cooperates with the rod to form a fluid-tight seal between the rod and guide.

The vessel is preferably equipped with an inlet 33 and an outlet 35, which are controlled respectively by valves 34 and 36. Immersion test member 17 may take different forms and be fabricated from various materials, but is preferably formed from sheet metal having a thickness of about 0.025 inch. The immersion member may be about 3 inches long, and 1 inch wide, with the lower portion tapering to a sharp point. Vessel 32 and preferably also receptacle 13 are constructed of a transparent material so that the immersion member and the liquid in the receptacle are visible. Pinion gear 25 is equipped with index lines 47. Support 29 is equipped with a single registry line 49. Pinion gear 25 can thus be rotated to raise and lower rod 21 and immersion member 17, the distance through which the immersion member is raised and lowered being indicated by index lines 47 on the pinion gear. Immersion member 17 has a horizontal line 51 scribed on its flat surface at a point about ¼ of an inch up from the lower sharp point.

In FIGURE 1, the apparatus is shown as it appears when sharp point 53 of immersion member 17 is just above the level of the liquid in container 13. FIGURE 2 depicts the liquid level and immersion member just after lower point 53 has contacted the liquid. The liquid at 55 rises along and wets the surface of the immersion member to level 57. The immersion member is then lowered until horizontal line 51 coincides with level 57 to which the liquid wets the immersion member. The apparatus is thus depicted in FIGURE 3.

In determining the surface activity of fluids under investigation by means of the apparatus of this invention, a sample of the test fluid is placed in receptacle 13, and test element 17 is lowered until its tip 53 just touches surface 15 of the liquid. The reading on index lines 47 of pinion 25 is noted. Then the test element is lowered by rotating pinion 25 until the line to which the liquid wets the immersion member coincides with horizontal line 51. The reading on the index lines on the pinion is again noted. The numerical difference between the initial and final readings is inversely proportional to the surface-wetting ability of the liquid. This value, when compared with the values obtained by tests made on other liquids, yields a qualitative measure of the relative wetting abilities of the various liquids.

The index lines on the pinion may be calibrated in arbitrary units, or in dimensional units, such as millimeters or fractions of an inch. Chuck 19 may be magnetic or mechanical, and the immersion element may be made of varoius metals or other solid materials whose wettability by the test fluids is of interest. Immersion elements having other shapes, such as conical, may also be used.

In order to obtain the best repeatibility of results, and to prevent oxidation or other gas effects on the liquid surface under study, it is preferred to conduct the test in vacua or in atmosphere of inert gas. The use of vacuum also serves to prevent errors introduced by air or other gas dissolved in the liquid sample. The vacuum need not be high and where volatile liquids are tested; the atmosphere may conveniently consist of a low-pressure phase of the test liquid. The hermetically-sealable container 32 provides means by which the atmosphere above liquid level 15 may be controlled.

An alternate form of the apparatus of this invention is shown in FIGURE 4. Chuck 19 is supported from rod 21 which extends through support-guide 61. Support-guide 61 is mounted at the center of cover plate 31. Rod 21 has threaded portion 63 which mates with threads 65 in support-guide 61. The support-guide is also equipped with seal 67 which prevents passage of fluid between the rod and support-guide. Dial gauge 69 is supported by arm 71 which is secured to cover plate 31. The dial-gauge indicator 73 rests on flat surface 75 at the upper end of rod 21. Chuck 19 supports capillary tube 77 which carries scribed line 79. The capillary 2 preferably has a diameter of about 0.1 to 0.3 inch, and the scribed line 79 is disposed at a distance of about 0.5 to 2.0 inches above the lower extremity thereof. The upper end of the capillary is vented through the chuck. Capillary 77 is lowered by rotation of rod 21 until the lower end in the capillary contacts the liquid. The rotatable dial of dial gauge 69, which is of commercial manufacture, is rotated until the zero position is opposite the needle. Rod 21 is then rotated to lower the capillary until the level of liquid rise within the capillary corresponds with the scribed line. The distance through which the capillary was lowered is read directly on the dial gauge. Gauges calibrated in thousandths of an inch are suitable for this purpose. It is known in the art that the height of rise of liquid level in a capillary is proportional to the surface tension of the liquid. The apparatus of this invention provides a convenient and accurate means for determining the height of rise of the fluid in the capillary. Since the distance between the end of the capilliary and the scribed line is known, it is possible to determine the level of liquid rise as an absolute dimension. However, for purposes of evaluating a group of liquids, it is satisfactory to merely note as an arbitrary number the distance through which the capillary was lowered from the point of initial contact with the liquid until the wet-line corresponds with the scribed line.

The utility of the apparatus of this invention has been demonstrated by determining the depth through which the immersion element had to be lowered into various liquids to bring the scribed line and the wet-line into coincidence. Results of these tests are presented in Table I. It is apparent that the apparatus accurately and consistently measured the effect of various known wetting agents, such as Triton X-100, Renex, and Tergitol NP-27, when added to distilled water. Similarly, it also measured the increased surface activity of various oils containing a zinc dialkyldithiophosphate.

*Table I*

| Liquid | Surfactant Added | Distance in Inches |
|---|---|---|
| Distilled Water | | 0.130 |
| Do | +1% Triton X-100 | 0.114 |
| Do | +1% Renex | 0.110 |
| Do | +1% Tergitol NP-27 | 0.112 |
| 160 Vis. Bright Stock | | 0.096 |
| Do | +1% Oronite 262 | 0.089 |
| 85 Vis. Neutral | | 0.106 |
| Do | +1% Oronite 262 | 0.089 |
| 80 Vis. Phenol Extract | | 0.094 |
| Do | +1% Oronite 262 | 0.088 |

Oronite 262 is a trade name for a surfactant comprising a 90%-solution of zinc dialkyldithiophosphate. Figures refer to the depth of immersion in inches necessary to bring the horizontal line on the immersion member and the wet-line into coincidence.

The apparatus of this invention is useful for measuring both the surface tension of a liquid by the height of rise of a liquid in a capillary, and also to measure the wettability of a material by a liquid by indirect measurement of the height of rise of the level to which the liquid wets said material. There is, however, no known convenient way to relate the results obtained from surface tension tests to the results obtained by wettability tests. If a liquid wets a solid, as water wets clean glass, it is because there is a greater attraction between the liquid and the solid than between the particles of the liquid, or the adhesion force is stronger than the cohesion force. On the other hand, if the liquid does not wet the solid, cohesion is stronger than adhesion and the liquid attempts to adopt a spherical form. It is commonly considered that as the wettability of a liquid increases, the surface tension of the liquid decreases.

What is claimed is:

1. An apparatus for determining the surface activity of a liquid comprising a vessel adapted to be hermetically sealed, said vessel having an inlet and an outlet equipped with inlet and outlet valves, respectively, with at least a portion of said vessel being composed of a transparent material, a rod member extending through the top of said vessel, said rod member and vessel top forming a fluid-tight seal, said rod member being operably supported by said vessel in vertically slidable relation therewith, the lower end of said rod member including a transparent capillary tube having a diameter of about 0.1 to 0.3 inch and having a horizontal line disposed thereon about 0.5 to 2.0 inch above the lower end thereof, a receptacle for said liquid supported in said vessel below the rod member, said receptacle being fabricated and positioned to render the upper surface of said liquid visible through said transparent material, and means engageable with said rod member and automatically responsive to movement thereof for measuring the vertical movement of the rod member as the lower portion thereof is lowered into said receptacle.

2. An apparatus according to claim 1 in which said means for measuring the vertical movement of the rod member comprises a pinion gear operably supported by said vessel and engaging a rack gear formed in the portion of said rod member extending above the top of said vessel.

3. An apparatus according to claim 1 in which said means for measuring vertical movement of the rod member comprises a dial gauge operably supported by said vessel with the indicator of said dial gauge contacting a flat, horizontal surface of said rod member.

4. A method for testing the surface activity of a liquid comprising lowering a test member having a horizontal indicia disposed thereon adjacent the lower extremity thereof into a quiescent sample of said liquid, and determining the distance through which said test member is lowered between the point of first contact of said lower extremity with said liquid and the point at which said liquid wets said test member to the level of said indicia.

5. A method in accordance with claim 4 in which said determination is made by measuring the vertical position of said test member at the point of first contact and again at the point at which the liquid wets the test member to the level of said indicia.

6. Apparatus for determining the surface activity of a liquid comprising an immersion test member, the lower end of which includes a transparent, vertical, capillary tube having a diameter of 0.1 to 0.3 inch and having a horizontal indicia disposed on said tube about 0.5 to 2.0 inches above the lower end thereof, means for moveably supporting said immersion member for movement in a vertical direction, a receptacle for said liquid disposed below said immersion member, said receptacle being fabricated and positioned to render the upper surface of said liquid visible, and means engageable with said immersion member and automatically responsive to movement thereof for measuring the distance of vertical movement of said immersion member as it is lowered into said receptacle.

References Cited in the file of this patent

UNITED STATES PATENTS

| 2,213,026 | Hoffman | Aug. 27, 1940 |
| 2,419,257 | Evans | Apr. 22, 1947 |
| 2,652,718 | Wiseman | Sept. 22, 1953 |
| 2,656,611 | O'Neill | Oct. 27, 1953 |

FOREIGN PATENTS

| 315,765 | Germany | Nov. 12, 1919 |